W. J. BRYON.
DOOR CHECK AND CLOSER.
APPLICATION FILED APR. 22, 1915.

1,363,390.

Patented Dec. 28, 1920.
5 SHEETS—SHEET 1.

Witnesses:
Ethel D. Baum
John J. Kanagan

William J. Bryon Inventor

W. J. BRYON.
DOOR CHECK AND CLOSER.
APPLICATION FILED APR. 22, 1915.

1,363,390.

Patented Dec. 28, 1920.
5 SHEETS—SHEET 4.

WITNESSES

William J. Bryon, INVENTOR

W. J. BRYON.
DOOR CHECK AND CLOSER.
APPLICATION FILED APR. 22, 1915.

1,363,390.

Patented Dec. 28, 1920.
5 SHEETS—SHEET 5.

UNITED STATES PATENT OFFICE.

WILLIAM J. BRYON, OF NEW YORK, N. Y.

DOOR CHECK AND CLOSER.

1,363,390.

Specification of Letters Patent.  Patented Dec. 28, 1920.

Application filed April 22, 1915. Serial No. 23,233

*To all whom it may concern:*

Be it known that I, WILLIAM J. BRYON, a citizen of the United States, and a resident of the borough of Manhattan, city, county, and State of New York, have invented certain new and useful Improvements in Door Checks and Closers, of which the following is a specification.

My invention relates to a combined door check and closer and belongs to that class of devices in which a liquid is employed as the checking medium and either a single or double acting spring is employed to effect the closing of the door.

One of the objects of the invention is to provide a structure of this character in which the elements are very compactly arranged and in which the entire structure may be readily seated in or on the floor at the inner end of the door to act as a "floor hinge."

Another object of the invention is to provide a structure in which the spring chamber and fluid chamber are situated in the same plane and the various elements are easily accessible so that they may be readily removed and placed in position when desired.

Another object of the invention is to provide means for readily disconnecting the door closing operating means from the door checking means so that the door may be permitted to remain in any position desired when opened.

Another object of the invention is to provide a structure by means of which the door closing means and the door checking means can be disconnected either by manually tripping an exposed spring latch, or else by the use of a special key adapted for that purpose.

Other objects will appear from the following description and claims.

Referring to the drawings forming a part of this specification.

In the drawings, like reference numerals refer to like parts in the several views.

1 represents a shallow casing made of suitable material in which there is provided two chambers 2 and 3 arranged in horizontal alinement or in the same horizontal plane separated from each other by a wall 4. A head or cap 5 when in position closes the open end of the chamber 2 by screw-thread connections 6 or other suitable means. A gasket 7 of usual construction is fitted between the head of the casing and the cap. In the upper wall 8 is fitted a screw-thread plug or plate 9 which is provided with a stuffing box construction which will be more particularly hereinafter described. A washer 9ª of suitable construction is fitted in a circular groove 9ᵇ in the wall 8 as shown and is then in a position to be pressed upon by a shoulder 9ᶜ in the edge of the plate 9. A thin metal ring 9ᵈ is placed above the washer 9ª in order to prevent wear on the washer when the device is assembled. A crank shaft 10 is seated at one end 11 in the lower portion 12 of the casing, and the other end passes through an opening 13 in the center of the plug or plate 9 and extends upwardly to form a connecting means 14 by means of which it is applied to the door. A gear wheel 15 fits over the end of the shaft 10 and is provided with a semi-circular opening 16 having two offset faces 17 and 17ª. A removable cap 20 having a flange 21 is fitted over the flanged portion 22 of the casing 1 and in one end of this cap is a concentric opening 23 surrounding the shaft 10. From the walls of this opening projects a flange 24 which fits into a concentric groove 26 in the underside of a ratchet gear 25 to hold said gear in place. A lug 27 projects from the hub portion of the ratchet gear and passes into and closely fits within the semi-circular slot 16 of the gear wheel 15. The lever 30 is fitted upon the upper end of the shaft 10 in such a manner as to turn with the shaft. The shaft may be squared at its upper end to closely fit a square hole in the end of the door in any approved manner. At the outer end of the lever at 31 is pivoted a double acting pawl 32 shown in Fig. 11.

The stuffing box for the shaft which has been hereinbefore referred to is preferably constructed in the following manner:—

Figure 1:
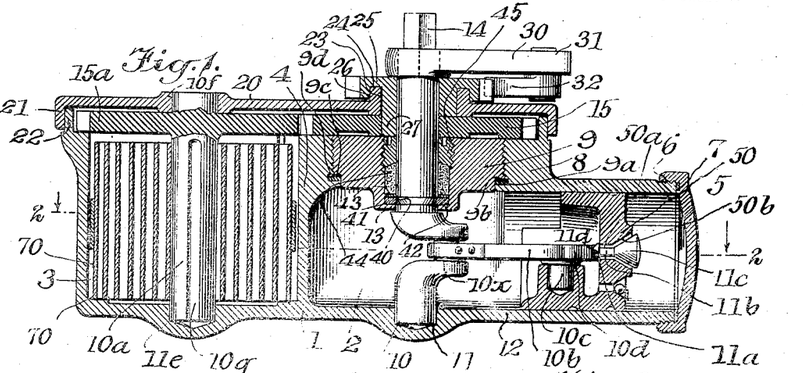
Figure 1. is a central longitudinal section of my combined door closer and check, on line 1—1 of Fig. 2, parts shown in elevation.

A beveled groove 40 is cut around the shaft 10 and in this groove closely fits a leather or other washer 41 which washer rests upon a seat 42 which is formed in the plate 9 as shown in Fig. 1. Resting upon the leather washer 41 is a metal ring 43 and upon the metal ring is a packing 44 which is held in place by the gland 45 of usual construction. The liquid which is placed in the chamber 2 is effectually prevented from leaking out of the said chamber around the shaft by the stuffing box construction just described.

Figure 2:
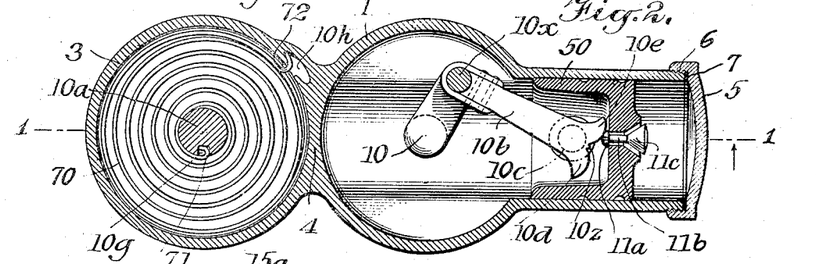
Fig. 2. is a horizontal section taken on line 2—2 of Fig. 1.
Figures 3, 4, 5, 6:
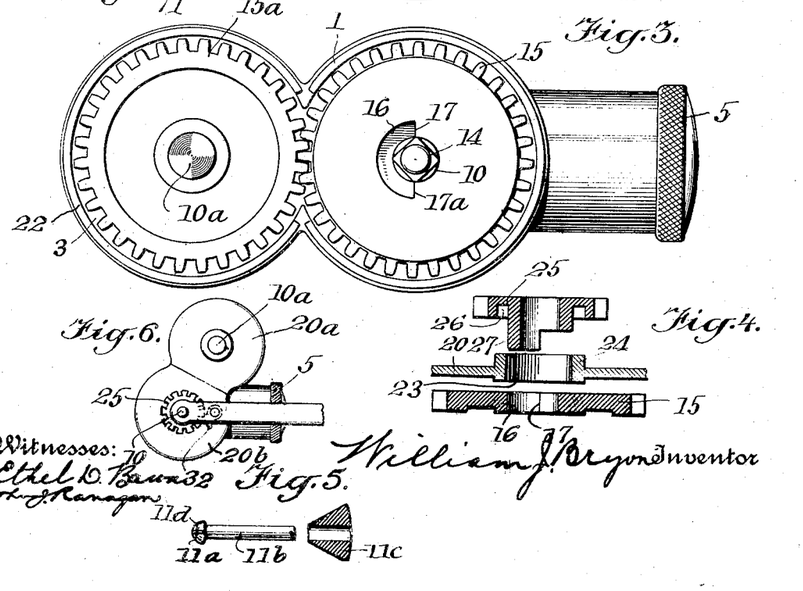
Fig. 3. is a plan view of my device with the cap and ratchet gear removed.
Fig. 4. is a detail in longitudinal section of the ratchet wheel, cap and coöperating gear shown in a position to be assembled, portions of the cap being broken away.
Fig. 5. is a detail view partly in section of a valve and valve stem in position to be assembled.
Fig. 6. is a plan view of a modified form of my device showing the protecting cap in two parts.

A connecting rod or link 10ᵇ is pivoted to the crank pin 10ˣ of the shaft 10, and this rod is pivoted at its other end at 10ᶜ to a piston 50 which is mounted to reciprocate in the cylinder. Arms 10ᵈ and 10ᵉ project from the rod or link 10ᵇ beyond the pivot 10ᶜ and these arms are provided with curved surfaces which co-act with the head 11ª on the valve stem 11ᵈ, which stem carries the valve 11ᶜ. The valve stem is slidingly mounted at 50ª in the piston head and the valve 11ᶜ co-acts with a valve seat 50ᵇ. In the head 11ª on the valve stem are cut one or more grooves 11ᵈ as shown in Figs. 2 and 5, which permit the flow of liquid through the piston from one side of the chamber to the other when the valve is held in its open position shown in Fig. 2.

A projection or lug 10ᶻ is situated near the center of the Y formed at the intersection of the two cam arms 10ᵈ and 10ᵉ. In operation, when the door is closing, a cam arm first forces the valve off of its seat and the door is then permitted to swing rapidly under the force of the closing spring, but with a slight cushion constituting the initial or primary graduating cushion of the device, graduating in the sense that it gradually becomes stronger while the valve is permitted to seat under the action of the cam until the positive cushion comes into play, and which is the result of the leakage of the liquid or air around the valve stem, while the cam is resisting the valve going to its seat. This graduating flow prevents all sudden shock or rebound of the door when the positive cushion comes into play, while owing to the valve being held off its seat during the initial operative movements of the door when the primary cushion is in play, the flow or escape of the liquid through the passageway while the cam is resisting the valve going to its seat, is so fast that no perceptible effect on the operation of the device under atmospheric changes, is possible. This particularly refers to the effect of the thickening and thinning of the oil in the piston chamber, and which although not materially effecting the operation of the present device, readily effects the operation of other devices and especially those provided with physical-working valves. In the present device, owing to the lack of material effect of atmospheric changes upon the operation in view of the release of the liquid while the primary cushion is in play, the parts when once set, will not vary in operation and need not be constantly adjusted to suit such atmospheric changes, as is necessary with devices heretofore provided. The speed, time or length of the primary and positive cushions depends on the way the valve and cam are constructed when the device is initially set up, in reference to the amount of leakage around the valve stem and the distance of traveling surface on the cam for the valve to travel on, and which is made sufficient for a person to pass through a doorway having a door equipped with the device, without being struck by the door. Said graduating cushion is not under the direct control of the crank shaft through the medium of changing the relative positions of the teeth of the gear wheels in such a manner as to regulate or control the length of the stroke of the piston, but is such as to regulate and affect the second or positive cushion, which is formed by the seating and unseating of the valve by the cam. As the piston reaches nearly the end of its stroke the cam arm no longer controls the valve and the valve becomes seated, so as to produce a positive or second cushion which while it may be made longer or shorter is in practice made operative to check the closing movement of the door more positively adjacent the latching position thereof. Just prior however to the time when the piston reaches the full end of its stroke, the lug $10^z$ impinges on the valve stem thereby shifting the valve from its seat permitting a flow of the liquid therethrough, thereby breaking the liquid cushion and effecting a certain and sudden closing of the door through the medium of the spring. This movement while affected after the cushion is released, will not permit the door to close with unnecessary force and jar, since the closing spring has lost the greater portion of its tension and thereby a very small part of the cushion formed by the valve when seated will be affected. This will constitute the third cushion of the plurality of cushions, and the closing of the door will be made more positive than would otherwise occur, but this automatic release is only used where air pressure is encountered against a door. The time of duration of the cushions may be regulated or controlled by displacing one of the gear wheels 15, $15^a$, depending upon which one is removable, or either in case both are removable, and turning the shaft 10 to cause the gear teeth to be advanced or set back a short distance, that is to cause the gear wheels to mesh at different points. This will move the piston through its connection with the shaft and vary the length of its stroke whereby to shorten or lengthen the positive cushion. This feature is common to all forms of the invention, in which the gear drive is employed the only distinction being that in using a double-acting spring, when wound, it is normally under equal tension in opposite directions and therefore the gears may be displaced or turned at will, while with a single-acting spring, the spring must be held while the turning or adjustment is effected, or the spring unwound entirely, to secure the adjustment from either shaft by turning the gear or gears on the crank shaft, a fraction of a turn, say, to advance the same one, two, or more teeth. The positive cushion is only approximately $\frac{1}{8}$ of an inch long, and of this $\frac{1}{8}$ of an inch movement of the piston in the cylinder, only a very small fraction is ever used. Only in case of very strong air pressure is the device used to this extent, or the automatic releasing device is used, and therefore if there are any atmospheric changes, it would be necessary to use a micrometer to measure the effect thereof upon the operation of the door under the control of the device.

In the lower wall of the chamber 3, at $11^e$ is seated one end of a shaft $10^a$ and its upper end is seated at $10^f$ in the plate 20. A gear wheel $15^a$ which meshes with the gear wheel 15 is secured to the shaft $10^a$ near its upper edge and it may be either integral with the shaft $10^a$ or suitably keyed thereto.

A longitudinal slot $10^g$ is cut in the surface of the shaft $10^a$ and preferably extends from its seat to the gear wheel. A double-faced vertical recess $10^h$ is cut in the wall of the chamber 3 near the junction of the wall 4. A coiled steel spring 70 fits into the vertical chamber around the shaft and one end 71 fits into the vertical slot $10^g$ in the shaft $10^a$, and the other end 72 of the spring fits into the vertical recess $10^h$ in the wall of the chamber. It is obvious therefore that when the shaft $10^a$ is turned in one direction it will operate against the tension of the spring and that the spring will under tension operate to turn the shaft back to its initial position. By means of this construction, the spring may therefore be reversed or turned end for end so as to make the device suitable for application to either a right or left hand door.

As shown in Fig. 6, the spring chamber may be arranged in a different relation to the liquid chamber from that shown in Figs. 1 to 3 inclusive, and the cap may be made in two parts $20^a$ and $20^b$.

Figure 7:
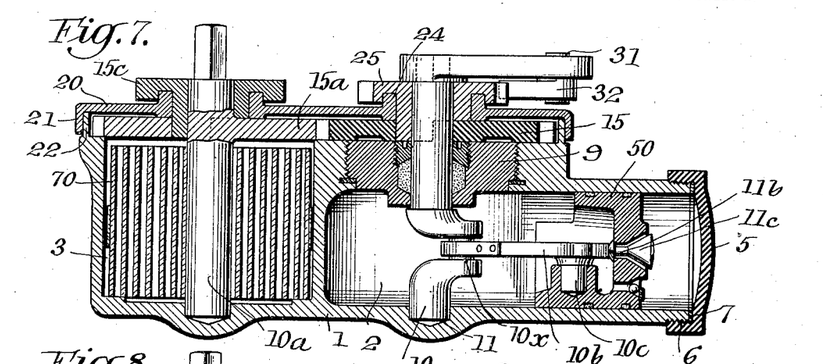
Fig. 7. shows a central longitudinal section of a form of my invention which is slightly modified from that shown in Fig. 1.
Figure 8:
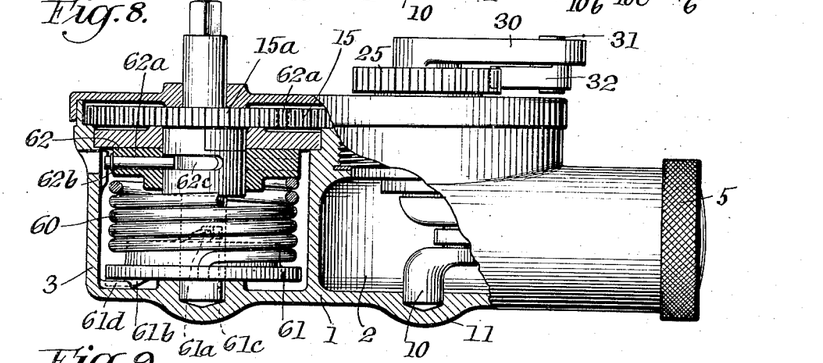
Fig. 8. is an elevation partly in section of another modified form showing a double acting spring for the door closing means.

In Fig. 7, I have shown a construction by means of which the shaft $10^a$ may be operatively connected to the door when desired, in which event the pawl and ratchet mechanism mounted on the shaft 10 performs the function of holding the spring from unwinding. In the event that the gear $15^a$ is separate from the shaft $10^a$ and loosely mounted thereon, and it is desired to operate the gear by means of a pawl and ratchet mechanism similar to that shown on shaft 10, such a gear may be readily mounted on the shaft $10^a$ by removing the idler disk $15^c$ and inserting the ratchet gear in place thereof.

In Figs. 8, 9, 10, 13 and 14, I show a double acting spring 60 of ordinary construction. This spring may be mounted directly in the chamber 3 between plates 61 and 62 to each of which plates the ends of the spring 60 are respectively secured. The plates 61 and 62 are both loosely mounted upon the shaft and on the upper and lower faces of the plate 61 are provided holding lugs $61^a$ and $61^b$. These lugs respectively abut against a lug $61^c$ projecting from the shaft and a lug $61^d$ projecting from the bottom of the casting. The plate 62 is provided with a series of radial holes $62^a$ in any one of which is mounted a pin $62^b$ one end of which projects into a circumferential slot $62^c$ and abuts against an end thereof when the spring is in its wound condition. The outer end of the pin $62^b$ rests against a lug projecting from the inner side of the wall of the chamber 3, so that when the spring is wound, it is held in that position by the outer end of the pin abutting against the last mentioned lug.

Figure 9:
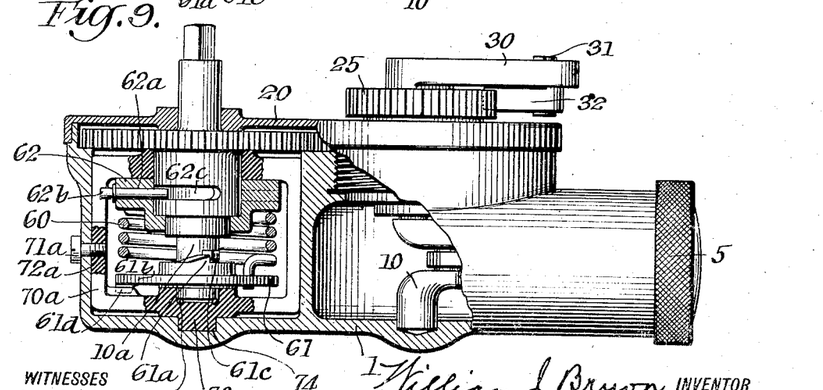
Fig. 9. is a view similar to Fig. 8, showing a modification of the means for mounting and assembling the door closing spring.
Figure 10:
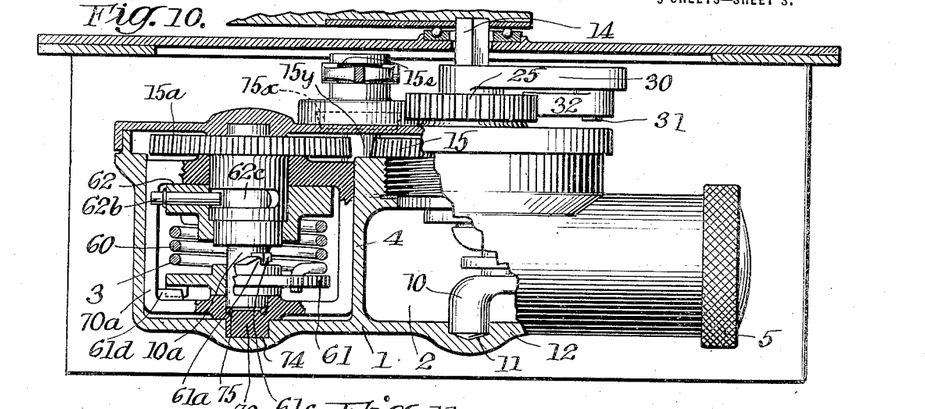
Fig. 10. is an elevation partly in section of another form of my invention in which the shifting gear is shown applied for the purpose of releasing the spring from the checking mechanism, the checking device being shown connected to a door.
Figure 13:
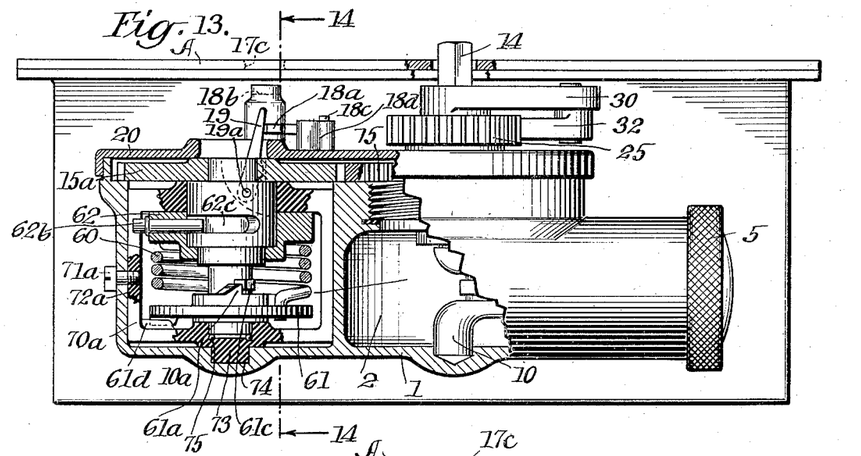
Fig. 13. is a side elevation partly in section showing another means for effecting the release of the spring from the checking device.

In Figs. 9, 10 and 13, I have shown a modified means of assembling the shaft $10^a$ and the double acting spring 60 and lower and upper plates 61 and 62. These parts are assembled by mounting them in a frame or cage $70^a$ which fits into the chamber 3 in the casing. This frame consists of lower and upper horizontal bars connected by two vertical bars. The frame is held in a fixed position preferably by means of a screw $71^a$ inserted through a hole $72^a$ in the side of the casing and extending into a screw threaded hole in one of the vertical bars of the frame. The upper horizontal bar of the frame is provided with a round opening through which the enlarged portion of the shaft is inserted. Projecting from the under side of the lower horizontal bar is a lug 73 which fits into a cavity 74 in the lower inner face of the casing and the lower end of the shaft $10^a$ is journaled in a roller bearing 75 in the upper face of the lower horizontal bar of the frame.

Figure 11:
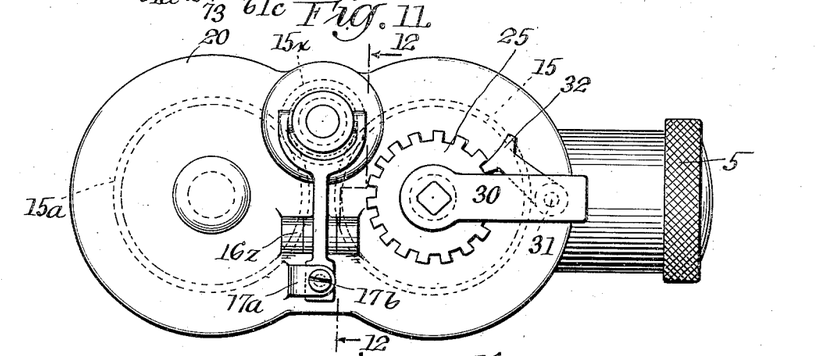
Fig. 11. is a plan view in full lines of the door closing and checking mechanism and shifting gear shown in Fig. 10.
Figure 12:
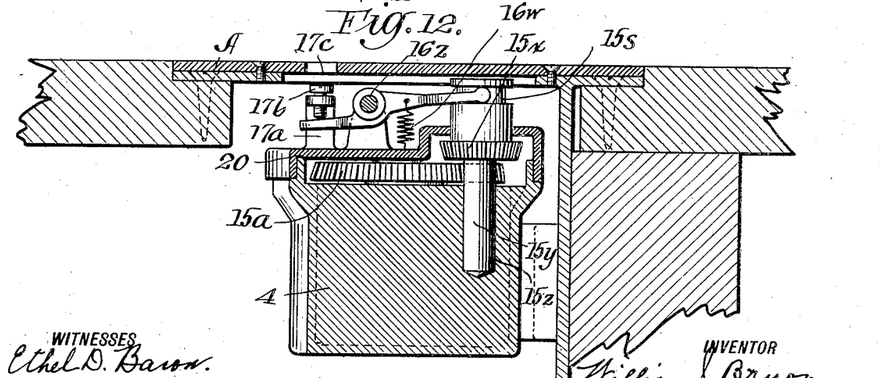
Fig. 12. is a section on the staggered line 12—12 of Fig. 11.

In Figs. 10 to 17 inclusive, I have shown means for temporarily disconnecting the spring shaft from the door checking mechanism so that the door may remain in any desired open position. This mechanism may be constructed in several different ways. One construction is illustrated in Figs. 10 to 12 inclusive in which the gears 15 and $15^a$ are beveled and are operatively connected to each other by means of beveled idler gear $15^x$ which is mounted to slide upon a rod $15^y$ which rod is fitted in the casing at $15^z$. A yoke shaped lever is pivoted at $16^z$, the yoke end of which engages the circumferential slot $15^s$ of the gear $15^x$. A spring $16^w$ secured at one end to the yoke end of the lever and at the other end to the cover or casing tends to pull the yoke end of the lever downward so as to hold the idler gear $15^x$ in mesh with the gears 15 and $15^a$. Mounted in a lug $17^a$ projecting from the frame adjacent the free end of the lever is a screw $17^b$, the head of which is situated in line with an opening $17^c$ in the floor plate A. From this construction, it will be seen that any suitable key or even a screwdriver may be inserted in the hole in the floor plate and engaged with the slot in the head of the screw and the screw turned so as to force the free end of the lever downward, thereby causing the lever to lift the idler gear $15^x$ out of engagement with the gears 15 and $15^a$ thereby disconnecting the door closing mechanism from the door checking mechanism. When the screw $17^b$ is turned in the opposite direction, the lever is pulled downward in the opposite direction by the coil spring $16^w$ and forces the beveled idler down into engagement with the operating gears 15 and $15^a$ thereby connecting the spring mechanism with the door checking mechanism.

In Figs. 13 to 16 inclusive, I have shown another means for disconnecting the door spring from the door check. Mounted upon the upper cap is a lever $18^a$ with a slotted hub as shown at $18^b$, the free end of the lever being normally pressed against a pin $18^c$ by means of a leaf spring $18^d$. A lever 19 is pivoted at $19^a$ on the upper end of the shaft $10^a$ and the lever is normally pressed outward by a spring $19^b$. The gear $15^a$ is provided with a vertical slot $a$ in the inner surface of its hub portion and a projection $b$ in the lever normally rests in this slot, when the upper end of the lever 19 is resting against the free end of the lever $18^a$.

As the slot in the pivoted portion of the lever $18^a$ is situated in line with the opening $17^c$ in the floor plate A, a key or screwdriver may be inserted in the slot of the lever $18^a$ and the said lever turned against the action of the leaf spring. The lever $18^a$ then forces the lever 19 out of the slot $a$ in the hub of the gear thereby disconnecting the gear from the shaft $10^a$ which results in disconnecting the door closing spring from the door checking mechanism. When the door is opened, the projection $b$ in the lever 19 rests against the inner surface of the hub of the gear $15^a$ and when the door is closed by hand, the lever 19 will just at the closing position of the door enter the slot $a$ of the gear $15^a$ thereby connecting the door closing spring with the door checking means, which results in effecting the closing of the door by the spring and at the same time putting into operation the door checking means.

Figures 14, 15, 16, 17:
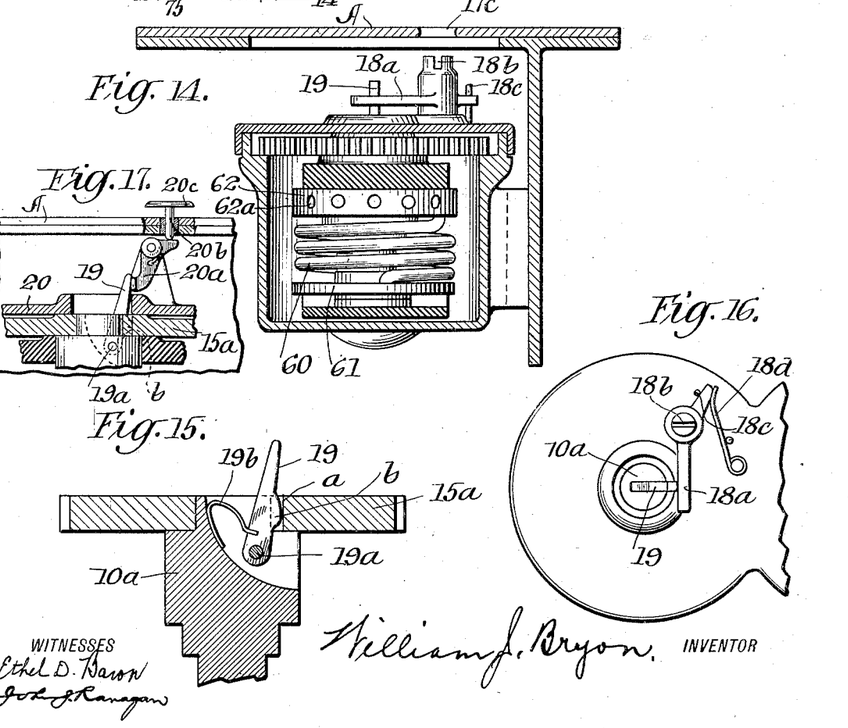
Fig. 14. is a section on the staggered lines 14—14 of Fig. 13.
Figs. 15 and 16 are detail views of portions of the releasing mechanism shown in Fig. 13.
Fig. 17. is a detail of a modified form of releasing mechanism.

In Fig. 17 is shown another modification by means of which the spring lever 19 may be disconnected from the gear $15^a$. A spring operated lever $20^a$ is mounted upon fixed lugs which project from the cap or casing, one end of which lever engages the end of the lever 19, and the other end of which is engaged by a shank $20^b$ of headed flanges $20^c$, the shank of which is mounted to slide in a packed opening provided for that purpose in the floor plate A. When the element $20^c$ is pressed downward with the foot of the operator or otherwise, the spring pressed lever $20^a$ moves the lever 19 out of the slot $a$ in the hub of the gear $15^a$, thereby causing the parts to be in a position to operate as above described, with respect to the construction shown in Figs. 13 to 15.

Figures 18, 19, 20:
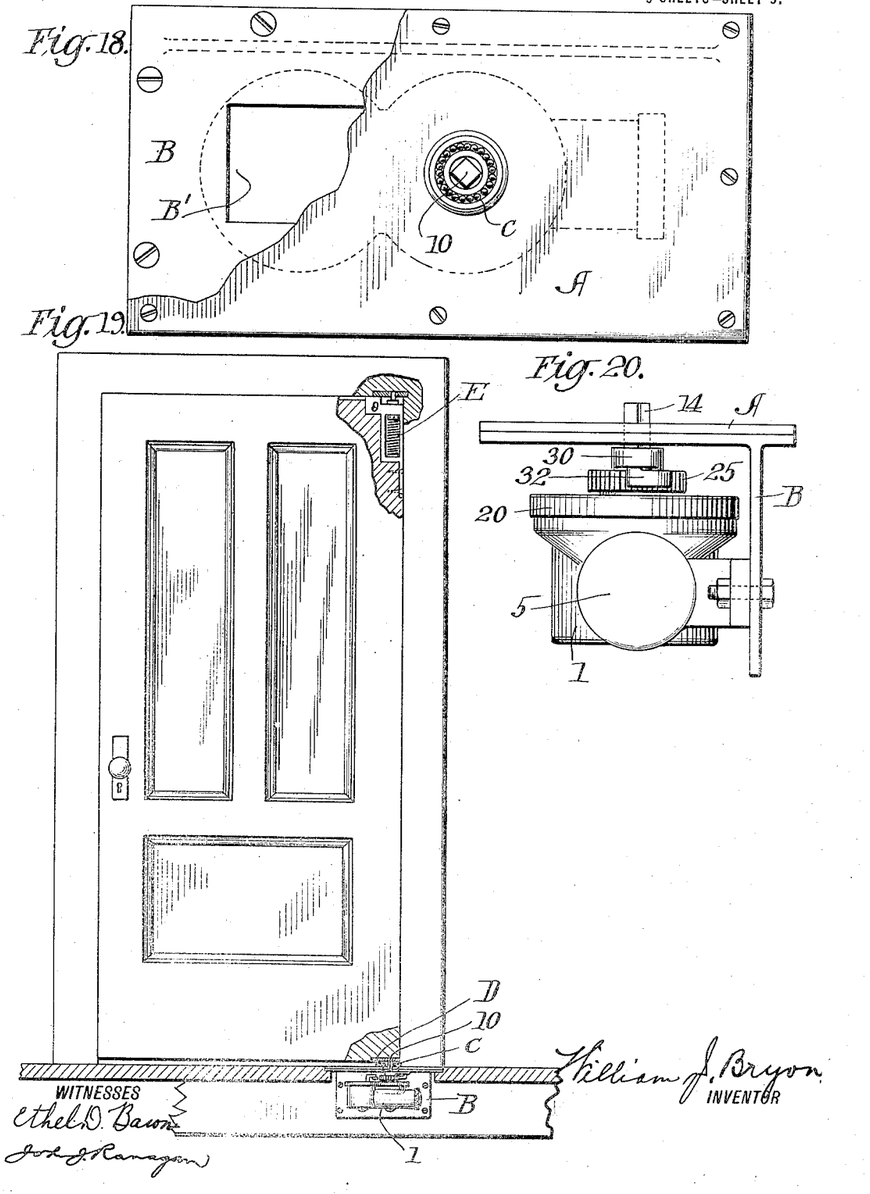
Fig. 18. is a plan view of a floor plate partly broken away.
Fig. 19. shows a general arrangement of a double acting spring at the upper hinge of a door and the door check in operative relation to the lower hinge of the door with its spring member thrown out of operation.
Fig. 20. is an end view showing the door check mounted upon the angle plate.

The casing 1 is preferably mounted in the floor as shown in Figs. 19 and 20 by securing the same by bolts or otherwise to an angle plate B which plate is open at the top at B' and is fastened to the floor beams in any suitable manner in a position for ready connection to the hinged portion of the door. The floor plate A is then screwed in place as shown in Figs. 18 to 20. Resting upon the floor plate is a ball bearing disk $c$ in juxtaposition to the squared end of the shaft $10^a$ which is fitted in an opening of the same contour in a plate D fixed to the bottom of the door. The ball bearing is not necessary to hinged supported doors.

In the construction shown in Fig. 19, the spring may be removed or disconnected and only the door checking mechanism remains in operation, in which case the door closing spring is fitted at the upper hinge corner of the door at E.

While I have shown certain features of my invention in the accompanying drawings, it is to be understood that said drawings are merely illustrative, and that I am not confined to what is there shown and herein described, in connection therewith, except as may be specifically set forth in the claims.

What I claim as new and desire to secure by Letters Patent, is:—

1. In a device of the class described, a casing, a door checking means, a door closing means coöperating therewith and connected directly thereto, operative connections between the checking means and closing means within the casing, and means for disconnecting the one from the other through said connections at will for throwing the parts out of operative connection, said means automatically connecting.

2. In a device of the class described, a door checking device, a gear mounted thereon, a door closing device provided with an operating gear having operative connections with the first mentioned gear, and means for removing the closing means from operative connections with the gears, said means serving to permit automatic connection of the parts mentioned.

3. In a device of the class described, a casing, a piston therein, a shaft, connections between the shaft and the piston, a valve in the piston operated by the connecting means, a gear connected to the shaft, a second shaft, a spring for operating the same, a gear connected thereto and having operative connection with the first named gear, means for disconnecting the last mentioned gear from its operating shaft.

4. In a device of the kind described, a cylindrical casing having a plurality of separated chambers located on the same horizontal plane and no communication therebetween, a piston operating in one of the chambers, an actuating means in the other chamber, a plurality of valves in the piston head, means for controlling the operation of successively lifting one of the valves from its seat, thereby permitting the flow of liquid therethrough and means operatively connecting said actuating means and piston.

5. In a device of the class described provided with two adjoining compartments situated in the same horizontal plane, separated one from the other by an imperforate partition, one compartment arranged to receive the door closing means and the other compartment arranged to receive a fluid or liquid and the door checking mechanism, said latter mechanism including a horizontally reciprocating piston and automatically operative valve mechanism for controlling the passage of said fluid or liquid therethrough.

6. A door check and closer of the class described, comprising a shaft, a spring operatively connected thereto, a second shaft having checking mechanism operatively connected thereto, means of connection between the two shafts, and means for manually disconnecting and automatically connecting the actuating spring and its shaft from the connection between the shafts whereby the door will swing free of any resistance.

7. In a door check and closer, an integral casing, a solid wall forming a part of the casing and dividing the same into two totally independent chambers, retarding means in one of the chambers and including a horizontally movable piston, moving means in the other chamber, said retarding means comprising in part, a post extending from the casing and operatively connected to the moving means, said chamber of the retarding means being adapted to contain a liquid as a cushion means, and means of interrupting the channel of possible escape for the liquid around the operating post.

8. In a device of the class described, a shallow casing having independent chambers located on the same horizontal plane, one of said chambers being a spring containing chamber and the other a liquid chamber having mounted therein a piston provided with a valve in combination with an operating crank shaft connections between the shaft and piston, said casing being adapted to be mounted upon a support, and said shaft projecting from the casing, also, said shaft being provided with a packing around one of its bearings.

9. In a device of the class described, a casing having independent chambers separated by a solid wall and disposed in the same horizontal plane, a spring in one chamber, a piston mounted for movement in the other chamber to produce a plurality of cushions during the forward stroke thereof, a valve in the piston, a shaft having operative connection with the piston, gears operatively connecting the spring to the shaft, and means of breaking the straight line of possible escape of fluid in the piston chamber around the shaft.

10. In a device of the class described, a casing provided with a liquid chamber, a piston in the chamber, a valve in the piston, a crank shaft also situated in the chamber, a rod pivotally connected respectively to the piston and to the crank shaft, said rod being provided with two side and an intermediate cam fingers to unseat the valve in the piston.

11. In a door check and closer of the class described, a shaft, a spring operatively connected thereto, a second shaft provided with a checking mechanism operatively connected thereto, means of connection between the two shafts, and means of manually disconnecting and automatically connecting the second or mechanism shaft from the spring operating mechanism, whereby the door will swing to a closed position under the control of the checking means only, said means serving to automatically connect the spring and second shaft when the door is closed.

12. In a device of the class described, a shallow casing having independent chambers separated by a solid wall and disposed in the same plane, a spring in one chamber, liquid in the other chamber, a piston mounted for movement therein to produce a cushion, a valve in the piston and opening in one direction, a crank shaft having connection with the piston gears operatively connecting the spring and crank shaft and means of breaking the straight line of the possible liquid path of escape around the crank shaft.

13. In a device of the class described, an integral casing provided with a liquid containing chamber and with a spring containing chamber separated from each other by a solid partition integral with the casing, both chambers being situated on the same horizontal plane and a single cover for said chambers.

14. In a door check and closer adapted to be fitted in the floor beneath a door, a shaft, a spring operatively connected thereto, a second shaft, checking mechanism operatively connected thereto and including a horizontally positioned cylinder and a similarly acting piston working therein, gear connections between the two shafts, the shaft to which the spring is connected being provided with means for its connection directly to the door at the bottom edge of the latter.

15. In a device of the class described, a single casing having two chambers situated on the same horizontal plane and divided by an imperforate partition totally separating the two chambers, a shaft in one of said chambers, a double-acting spring operatively connected to the shaft, a second shaft, checking means operatively connected to said second shaft and including a horizontally moving piston, connecting devices between the two shafts externally of the chambers, and means provided on one of the shafts for its connection to a door.

16. In a device of the class described, a shaft, a spring operatively connected thereto, a second shaft, checking mechanism operatively connected thereto, gear connections between the two shafts, and means for disconnecting the gear connections, said means being independent of the gears, and one of the shafts being provided for engagement and connection with a door.

17. In a device of the class described, a casing provided with a liquid containing chamber and with a spring containing chamber, separated from each other by an integral solid partition dividing the mechanism thereof, both said chambers being cylindrical and situated on the same horizontal plane joined by the partition, and covering means for said chambers, said mechanisms being disengageably connected.

18. A door check and closer, comprising the combination with a casing, having a solid wall dividing the same into two chambers situated on the same plane, a door checking mechanism operating horizontally in one chamber and a door closing mechanism in the other chamber and adapted for connection with a hinged door; of a bracket having means for suspending the casing thereon, said closing mechanism having a post projecting above the bracket, and a plate covering the bracket with the exception of the post.

19. In a device of the class described, a spring operated shaft, a crank shaft, connections between the two shafts, a piston, a valve in the piston, a pivotal connection between the crank shaft and the piston, means for unseating the piston valve just prior to the time when the piston reaches the full end of its stroke to break the liquid cushion and effect a certain and sudden closing of the door.

20. In a device of the class described, a cylindrical casing, a crank shaft mounted therein, a piston also mounted therein, a valve in the piston head, a pivotal connecting rod between the crank shaft, the piston head and means attached to the connecting rod for lifting the valve from its seat thereby permitting the flow of liquid therethrough to provide a plurality of cushions, and additional means to lift said valve from its seat to reduce the cushion.

21. A door check and closer comprising a pair of shafts operatively connected on the same horizontal plane, an operating means for one of the shafts, checking mechanism connected to the other shaft, and means for connecting and disconnecting the shafts.

22. In a door check and closer of the class described, a shaft, a spring operatively connected thereto, a second shaft, checking mechanism operatively connected thereto, gear connections between the two shafts, and means for manually disconnecting and automatically connecting the spring shaft from its gear, whereby the door will swing free.

23. A door check and closer comprising a pair of shafts operatively connected on the same horizontal plane, an operating means for one of the shafts, checking mechanism connected to the other shaft, and means to connect the operating means and checking mechanism when the door is closed and to permit the two to operate independently whereby the door may be swung freely of the operating means.

24. In a door check and closer of the class described, a shaft, a spring operatively connected thereto, a second shaft, a checking mechanism operatively connected thereto, gear connections between the two shafts, means of manually disconnecting and automatically connecting the checking mechanism and the spring mechanism, mechanism for movably supporting the spring mechanism, said first means being adapted to release the spring mechanism, and means for permitting the door to swing free of the spring mechanism to a closed position under the control of the checking means only.

25. In a device of the class described, including a casing having a liquid cushion, a spring operated shaft, a crank shaft, connections between the two shafts, a piston, a plurality of valves in said piston, a bar pivotally connecting the crank shaft and the piston, means for controlling one of said piston valves by said bar, and means for unseating said controlled valve just prior to the time when the piston reaches the full end of its stroke so as to break the liquid cushion and effect a certain and sudden closing of the door.

26. In a device of the class described, a shallow casing having a plurality of chambers, said chambers being separated by a solid wall and being on the same horizontal plane, and coöperative checking and closing mechanisms mounted in said chambers and operatively connected externally of the chambers.

27. In a device of the class described, a shallow integral casing having two separated chambers, divided by a solid wall and both chambers being situated on the same horizontal plane, a crank shaft, link and piston in one of said chambers and a spring in the other chamber, and a plurality of gears connecting the mechanisms of said chambers.

28. In a device of the class described, a casing comprising a single-piece casting provided with a horizontal liquid containing chamber, a horizontally movable checking piston in said chamber, and a spring containing chamber separated from each other by a solid partition, both chambers being situated exactly in the same horizontal plane, a cap for the two chambers and means to sustain the casing in a floor recess.

29. In a device of the class described provided with two adjoining compartments situated on the same horizontal plane and separated one from the other by an imperforate partition, one compartment being arranged to receive the door closing means and the other arranged to receive the checking mechanism, said checking mechanism including a horizontally actuating piston, said closing means and said checking mechanism having means of being operatively connected and disconnected as and for the purposes set forth.

30. In a device of the class described, a casing provided with two separated chambers situated on the same horizontal plane, a shaft, a gear and a spring provided for one of said chambers, a gear, a crank shaft, a link and a piston provided for the other chamber, said piston having a plurality of valves located in the head thereof, and said link being provided with cam fingers for the purpose of controlling one of said valves located in the head of the piston, when in operation.

31. In a device of the class described, in combination with a shaft, a gear wheel mounted thereon, a second shaft having a gear wheel mounted thereon, the hubs of said gear wheels being provided with interlocking keys to secure the same to said shafts, a closing mechanism connected to the first shaft, a checking mechanism connected to the other shaft, a casing having a pair of compartments divided by a solid wall and located on the same plane in horizontal alinement to receive said shafts and mechanisms therein, and means to connect one of said shafts to a door.

32. In combination with a shaft, a gear mounted thereon, a second shaft having a gear wheel mounted thereon, means for connecting the one gear wheel to the other, keys locking said gear wheels to the shafts, said gear wheels being in yielding engagement, and a casing having two chambers in horizontal alinement, with checking and closing mechanism therein and operatively connected by said gear wheels.

33. In combination with a shaft, a gear mounted thereon, a second shaft having a gear wheel mounted thereon, means for securing one gear wheel with the other, means for operating the second gear wheel from the shaft, operating and retarding mechanisms connected to said shafts, and means to render said gears inoperative, whereby to permit adjustment thereof to regulate the movements of the retarding mechanisms.

34. In combination with a shaft, a gear wheel mounted thereon, a second shaft having a crank, a link and gear wheel mounted thereon, means for connecting one gear wheel to the other, means to operate the second gear wheel from the shaft, a casing, a piston therein and means of controlling the travel of the piston at or near the end of the stroke by the crank and pivoted link through the medium of manually changing the positions of the teeth of the gear wheels.

35. In combination with a shaft, a gear mounted thereon, a second shaft, a gear mounted thereon, means for connecting one gear to the other, means to operate one gear from a shaft, a casing, a piston therein, means of controlling the travel of the piston at or near the end of its stroke, a valve in the piston forming a cushion, and means for controlling the cushion formed by the valve when seated at or near the end of the finish of the stroke of the piston by the shaft through the medium of manually changing the position of the gear wheels.

36. In a door check and closer, a shaft, a spring operatively connected thereto, a second shaft having a checking mechanism operatively connected thereto, and gear connections between the two shafts, said gears serving as means for controlling the checking mechanism through the shafts by changing the relative positions of the gear wheels, one of the shafts being provided with means for connection to a door.

37. In a device of the class described, including a casing having a liquid cushion, a spring operated shaft, a crank shaft, connections between the two shafts, a piston, a plurality of valves in said piston, a bar pivotally connecting the crank shaft and the piston, means for automatically controlling one of said valves by said bar, and means for automatically unseating said controlled valve just prior to the time when the piston reaches the full end of its stroke so as to break the liquid cushion and effect a certain and sudden closing of the door.

38. In a device of the character described, a cylindrical casing having a plurality of separated chambers located on the same horizontal plane and no communication therebetween, a piston operating in one of the chambers, a spring in the other chamber for operating the piston, a plurality of valves in the piston head, means for automatically controlling one of the valves so as to adjust and regulate the length of its positive cushion, and also to successively automatically lift said valve from its seat, thereby permitting the flow of liquid throughout.

39. A device of the class described, comprising a casing having two chambers, a liquid chamber and a spring chamber, both of said chambers being situated on the same horizontal plane, a piston in said liquid chamber, means for operating the piston, a passageway communicating with the chamber on opposite sides of the piston, a valve for controlling the flow of the liquid through the said passageway, two oscillating cams movable with the piston for controlling the action of the valve, one of said cams being operative for a left-hand door and the other for a right-hand door, and means for operating said cams, said spring chamber being provided with a spring therein, a hub on which said spring is suitably operatively mounted, said spring means and said crank shaft, link and piston means having means of being operatively connected together for the purposes set forth.

40. In a device of the class described, a casing, door moving and retarding mechanisms mounted therein, one of said mechanisms including a shaft, a double acting spring operatively connected to said shaft, a gear mounted thereon, a second shaft associated with the other mechanism and having a gear mounted thereon, and a checking mechanism, said second shaft being operatively connected to the spring shaft through the medium of the gears, and means provided on one shaft for its connection to a door.

41. In a device of the class described, comprising a casing having two chambers, a liquid chamber and a spring chamber, both said chambers being situated on the same plane horizontally, the said liquid chamber having a piston and means for operating the piston therein, a passageway communicating with the chamber at opposite sides of the piston, a valve for controlling the flow of the liquid through the passageway and providing a plurality of cushions, and an oscillating cam movable with the piston for controlling the valve to automatically regulate the flow of the liquid through the passageway during the forward movement of the piston, said spring chamber having a spring therein operatively mounted on a hub, said operating spring means and said operating piston means being provided with means of being operatively connected together.

42. In a device of the class described, a casing comprising two chambers, a liquid chamber and a spring chamber, said liquid chamber having a piston therein provided with an aperture communicating with the chamber at opposite sides of the piston, a valve for controlling the flow of liquid through said aperture, a crank shaft and a link pivotally connecting the shaft and piston, said link being provided with a cam for engagement with and controlling the action of the valve, said spring chamber being provided with a spring therein suitably mounted, said spring chamber operating mechanism and said liquid chamber operating mechanism having means of being operatively connected together for the purposes set forth.

43. In a device of the class described, a casing comprising two chambers, a liquid chamber and a spring chamber, both said chambers being situated in the same plane horizontally, a piston in said liquid chamber provided with a passageway communicating with the chamber at opposite sides of the piston, a valve for controlling the flow of liquid through the passageway, a crank shaft, a piston and a link, said link being pivotally connected to the crank shaft and piston and having means for operative engagement with the valve.

44. In a device of the class described, a casing comprising two chambers, a liquid chamber and a spring chamber, both said chambers being situated in the same horizontal plane and divided by a solid wall, a piston in said liquid chamber and provided with a passageway communicating with the chamber at opposite sides of the piston, a valve for controlling the flow of liquid through the passageway, a crank shaft, a link connecting the crank shaft and piston, a spring in the spring chamber, a shaft on which the spring is operatively mounted, and means of operatively connecting the spring means, and said crank shaft and piston means.

45. A device of the class described, a casing comprising two chambers, a liquid chamber and a spring chamber, said chambers being situated on the same horizontal plane, the said liquid chamber having a piston therein, means for operating the piston, a passageway communicating with the chamber at opposite sides of the piston, a valve for controlling the flow of liquid through the passageway, and a cam movable with the piston for controlling the valve, to automatically regulate the flow of the liquid through said passageway during the forward movement of the piston.

46. A device of the class described, comprising a casing having a pair of chambers situated upon the same horizontal plane and including a liquid chamber and a spring chamber, a piston in said liquid chamber, a passageway in the piston communicating with the liquid chamber at opposite sides of the piston, a valve for controlling the flow of liquid through the passageway, a cam movable with the piston for controlling the valve, to automatically regulate the flow of the liquid through the passageway during the forward movement of the piston, a hub or shaft in the spring chamber, a spring operatively mounted thereon, the said operating spring means and said operating piston means being provided with means of being operatively connected together or disconnected, at will.

47. A device of the class described, a casing comprising two chambers, a liquid chamber and a spring chamber, both said chamber being situated on the same horizontal plane, said liquid chamber having means for operating the piston, a passageway communicating with the chamber at opposite sides of the piston, and means including an oscillating device movable with the piston for automatically controlling the flow of the liquid through said passageway.

48. A device of the class described, comprising a casing having two separated chambers, a liquid chamber and a spring chamber, said chambers being situated on the same horizontal plane, said liquid chamber having means for operating the piston, a passageway communicating with the chamber at opposite sides of the piston, means including an oscillating device movable with the piston for automatically controlling the flow of liquid through said passageway, a spring in said spring chamber, a hub or shaft on which said spring is operatively mounted, said operating spring and said piston operating means being provided with means of being operatively connected together.

49. A device of the class described, a casing comprising two chambers, a liquid chamber and a spring chamber, both said chambers being situated on the same horizontal plane, a piston in the liquid chamber, said liquid chamber having means for operating the piston, there being a passageway through the piston communicating with the liquid chamber at opposite sides thereof, means including an oscillating device movable with the piston for automatically controlling the flow of liquid through said passageway, a spring in said spring chamber, a hub on which said spring is operatively mounted, means for operatively connecting said spring means and said piston operating means, and means to disconnect said spring means and said piston operating means with respect to each other and simultaneously disconnect one of the two last mentioned means from a door to be operated.

50. In a device of the class described, having a shaft and a spring operatively connected thereto, a second shaft, a checking mechanism, and operatively connected thereto, gears provided on both of said shafts, means adapted through the medium of the shafts and gears to control the action of the checking mechanism, and means provided on one of said shafts for their connection to a door.

51. In a device of the class described, a shaft, a double-acting spring operatively connected to said shaft, a second shaft, a checking mechanism operatively connected to said second shaft, connecting devices between the two shafts and means to disconnect and cause the automatic connection of said connecting devices, said checking mechanism including means for releasing the same near the end of its operative action.

52. In a device of the class described, a shaft; a double-acting spring operatively connected to said shaft, a second shaft, a checking mechanism operatively connected to said second shaft, connecting devices between the two shafts, means to disconnect said connecting devices, and means provided on one of said shafts for its connection to a door.

53. A device of the class described, comprising a casing having a liquid chamber and a spring chamber, both said chambers being located on the same horizontally positioned plane substantially, and separated by a solid wall, a piston in said liquid chamber provided with an aperture communicating with the chamber at opposite sides of the piston, a valve for controlling the flow of liquid through said aperture, an actuated crank shaft and a pivoted link connecting said crank shaft with the piston, said link being provided with two cams for controling the action of the valve when in operation, one of said cams being operative for a left-hand door and the other for a right-hand door, said spring chamber being provided with a spring suitably operatively mounted on a shaft, said spring operated means and said operated crank shaft, link and piston means having means of being operatively connected together.

54. A device of the class described, a single casing formed with two chambers separated by an imperforate wall, said chambers being a liquid chamber and a spring chamber situated substantially on the same horizontal plane, said liquid chamber being provided with an operative mechanism consisting of a piston, said piston having an aperture communicating with the chamber at opposite sides of the piston, a valve in the aperture for controlling the flow of the liquid through the aperture, an actuated crankshaft having a gear wheel mounted thereon and a pivotal link connecting said crank with the piston, said link being provided with two cams for controlling the actions of the valve when in operation, one of said cams being operative for a left hand door and the other for a right hand door, said spring chamber being provided with an operating mechanism consisting of a spring suitably attached to a post and having a gear wheel mounted thereon, said spring mechanism and said liquid chamber mechanism having means for being operatively connected or disconnected.

55. In a device of the class described, a casing containing two chambers, both said chambers being situated in the same horizontal plane, one of said chambers being provided with a gear, a shaft, a pivoted link and a piston, said piston being provided with a plurality of valves and one of said valves having means of being controlled by said pivotal link when in operation, a shaft in the other chamber, a spring in the chamber for operating said shaft and a gear on the spring shaft and meshing with the aforesaid gear.

56. In a device of the class described, a casing containing two chambers, both of said chambers being situated in the same horizontal plane, one of said two chambers being provided with a gear, a shaft and a spring, and the other of said chambers being totally separated from the first chamber, a retarding mechanism including a piston in the latter chamber, a plurality of valved passageways through the piston, means for successively causing the unseating and seating of the valve, to provide a plurality of cushions during the closing movements of the piston, geared means operatively connecting the spring and piston, and means operative through the medium of said connecting means to regulate the stroke of the piston and the operation of the valve as and for the purposes set forth.

57. In a device of the class described, a casing having a liquid cushion, a spring operated shaft, a crank shaft, connections between the two shafts, a piston, a plurality of valves in said piston, a bar pivotally connecting the crank shaft and the piston, means for controlling one of said piston valves by said bar, and means for regulating the seating of said valve to hold the same unseated during the initial stroke of the piston and permitting gradual seating thereof, said means also serving for unseating said controlled valve at a pre-determined time.

58. In a device of the class described, a casing provided with a liquid chamber and with a spring contained chamber separated by a solid partition dividing the mechanisms thereof, said chambers being located on the same horizontal plane, a piston operating horizontally in the liquid chamber, means for operating the piston, there being a passageway communicating with the chamber at opposite sides of the piston, and means including an oscillating device for automatically controlling the flow of liquid through the passageway.

In witness whereof I have hereunto set my hand at the borough of Manhattan, city, county and State of New York, this sixth day of April, 1915.

WILLIAM J. BRYON.

In presence of—
ETHEL D. BARON,
JOHN J. RANAGAN.